Patented Dec. 7, 1937

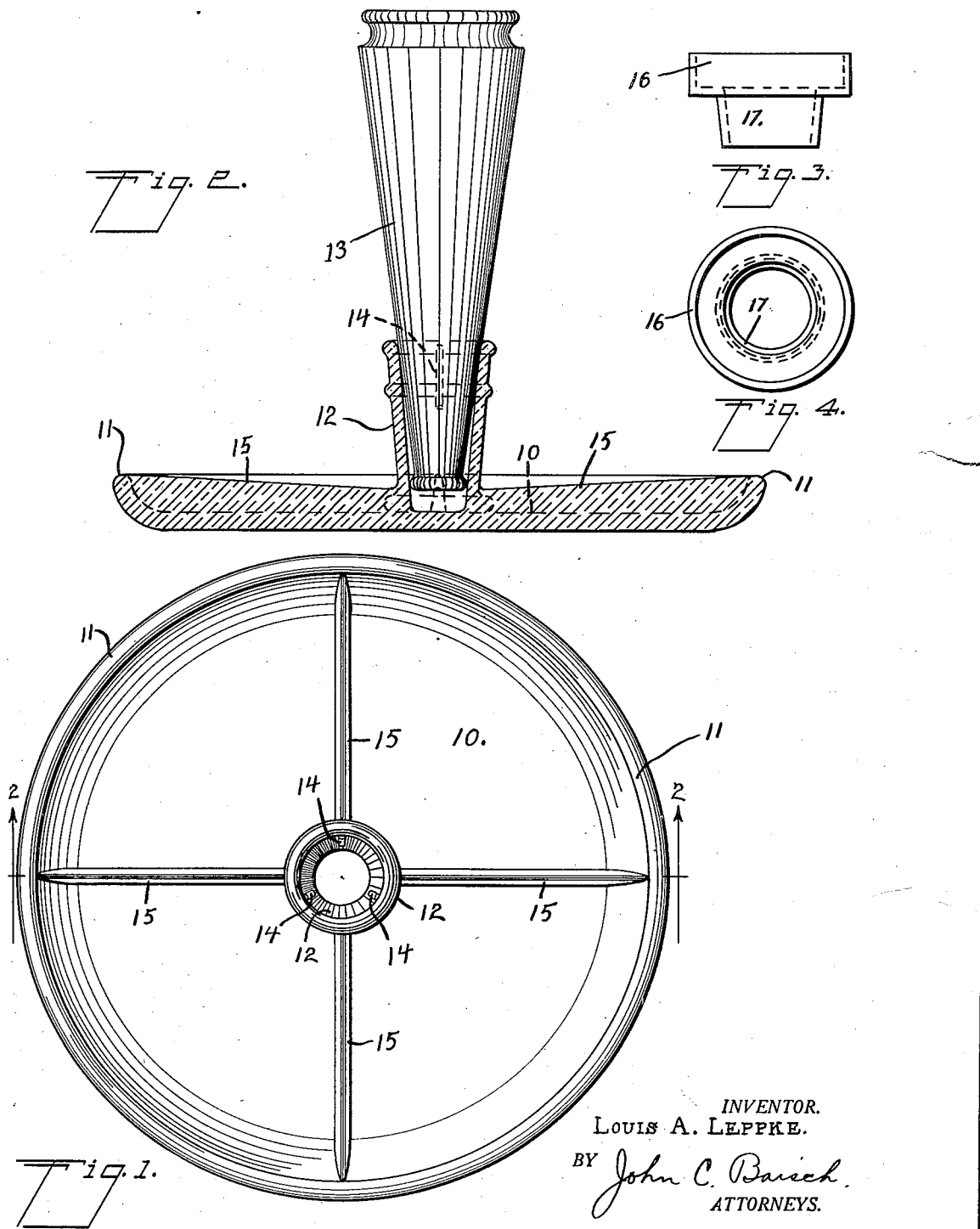

2,101,401

UNITED STATES PATENT OFFICE 2,101,401

SERVING DEVICE

Louis A. Leppke, Omaha, Nebr.

Application February 4, 1936, Serial No. 62,283

1 Claim. (Cl. 65—15)

This invention relates in general to serving devices and more particularly to devices for serving lap lunches and the like including liquid refreshments or beverages.

It is the object of my invention to provide a serving device for serving lap or plate lunches and the like having means for holding a container for liquids.

Another object is to provide such a device that may be held in the lap and which will hold the container for liquid beverages securely without material danger of said container being unintentionally tipped, thereby spilling the liquid.

Another object is to provide such a device wherein the beverage container occupies a minimum of space.

A further object is the provision of such a device adapted to securely hold containers or cups of different types.

A still further object of the invention is the provision of such a device that is simple in construction and inexpensive to manufacture.

Numerous other objects and advantages of the invention will be apparent as it is better understood from the following detailed description, taken in connection with the accompanying drawing wherein:

Figure 1 is a plan view of the serving device without a glass or container in the holder.

Figure 2 shows the serving device with a beverage container or glass received in the holder thereof, said serving device being shown in vertical section, taken on line 2—2 of Figure 1.

Figure 3 is a side view of an insert for the holder to provide means for holding a cup or glass of a different type and shape from that shown in Figure 2.

Figure 4 is a plan view of said insert.

Referring more particularly to the drawing, which illustrates the preferred embodiment of my invention, reference numeral 10 indicates a plate or platter of glass or the like having an upturned annular edge 11. Centrally of the plate and formed integrally therewith is a holder 12 for a beverage container 13. In my preferred embodiment the container 13 is generally frusto-conical in shape with the small end depending, said small end being received in the holder 12 which is also frusto-conical in shape to correspond with the small end of the container.

While I have shown the holder frusto-conical in shape and with a frusto-conical container, said holder may be frusto-pyramidal in shape or having any other shape that may be desired, in which event the container would necessarily be of a similar shape for reception in the holder.

In my preferred embodiment the holder is provided with vertically extending lugs 14 on the inside thereof adapted to abut against the sides of the container received in the holder to prevent rocking of said container in the holder.

Partitions 15, formed integrally with the plate, divide said plate into compartments in which various foods may be respectively placed without intermingling.

Should it be desired to use an ordinary glass or cup instead of the frusto-conical container 13, an inset is provided having a receiving cup 16 in which a glass or cup is received and held, and a depending annular flange 17, frusto-conical in shape and adapted to be stably or firmly received in the holder.

My serving device is particularly adapted for serving Dutch lunches or lap lunches or the like. Beer may be served in the container and sandwiches and salad and the like placed in the respective compartments of the plate. Or, by using the inset, a cup of coffee may be served instead of the beer, said cup being received in the receiving cup 16 of the inset.

It is thought that the invention and many of its attendant advantages will be understood from the foregoing description, and it will be apparent that various changes may be made in the form, shape, construction and arrangement of the parts without departing from the spirit and scope of the invention or sacrificing all of its material advantages, the form hereinbefore described being merely a preferred embodiment thereof.

Having thus described my invention what I claim and desire to secure by Letters Patent is:

The hereindescribed serving device comprising a plate having a central integrally formed supporting member upstanding therefrom a distance substantially greater than the thickness of the plate, and having a tapering upwardly opening socket, said plate having integral ribs radiating from said member and reenforcing the latter, and a relatively tall, rigid beverage container having a tapering lower end for extension into the said tapering socket in a manner to prevent overturning of the container, said holder having annularly spaced internal ribs vertically within its said socket uniformly engageable with the container to form a slip grip with the latter and at the same time prevent sticking of the container in the socket of the supporting member.

LOUIS A. LEPPKE.